Feb. 20, 1923.
F. G. MITCHELL
1,446,264
SUPPORTING AND GUIDING MEANS FOR ENDLESS BAND AND LIKE CONVEYER
Filed Dec. 30, 1919    3 sheets-sheet 1
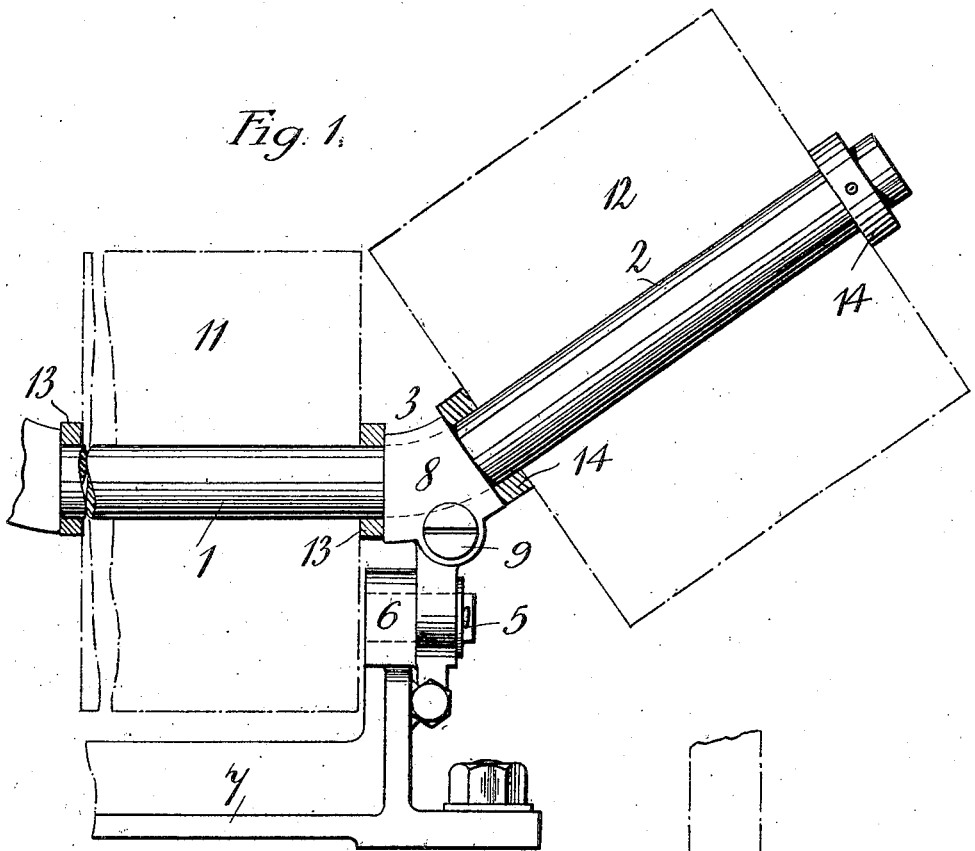
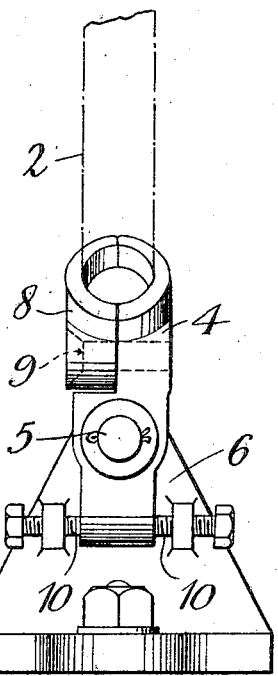

Feb. 20, 1923.
F. G. MITCHELL
1,446,264
SUPPORTING AND GUIDING MEANS FOR ENDLESS BAND AND LIKE CONVEYER
Filed Dec. 30, 1919        3 sheets-sheet 2
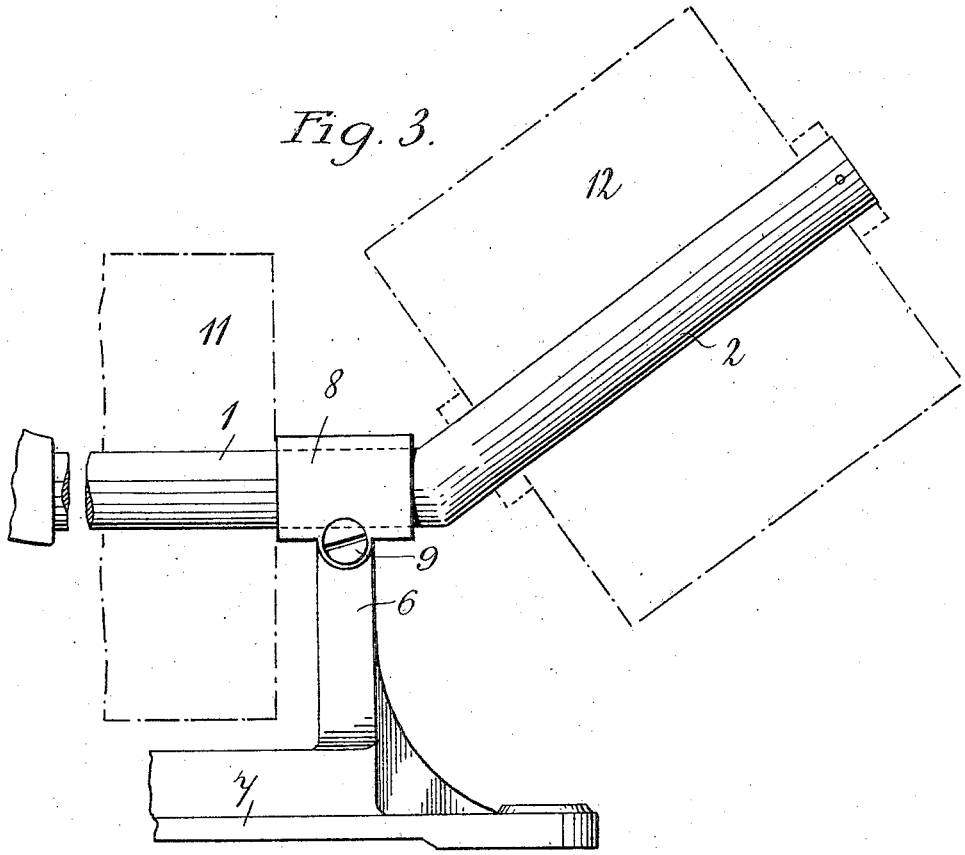
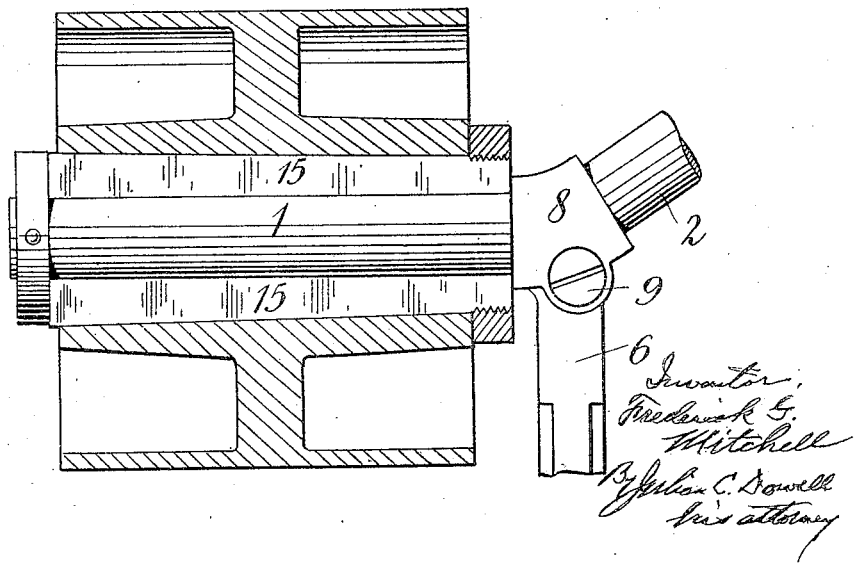

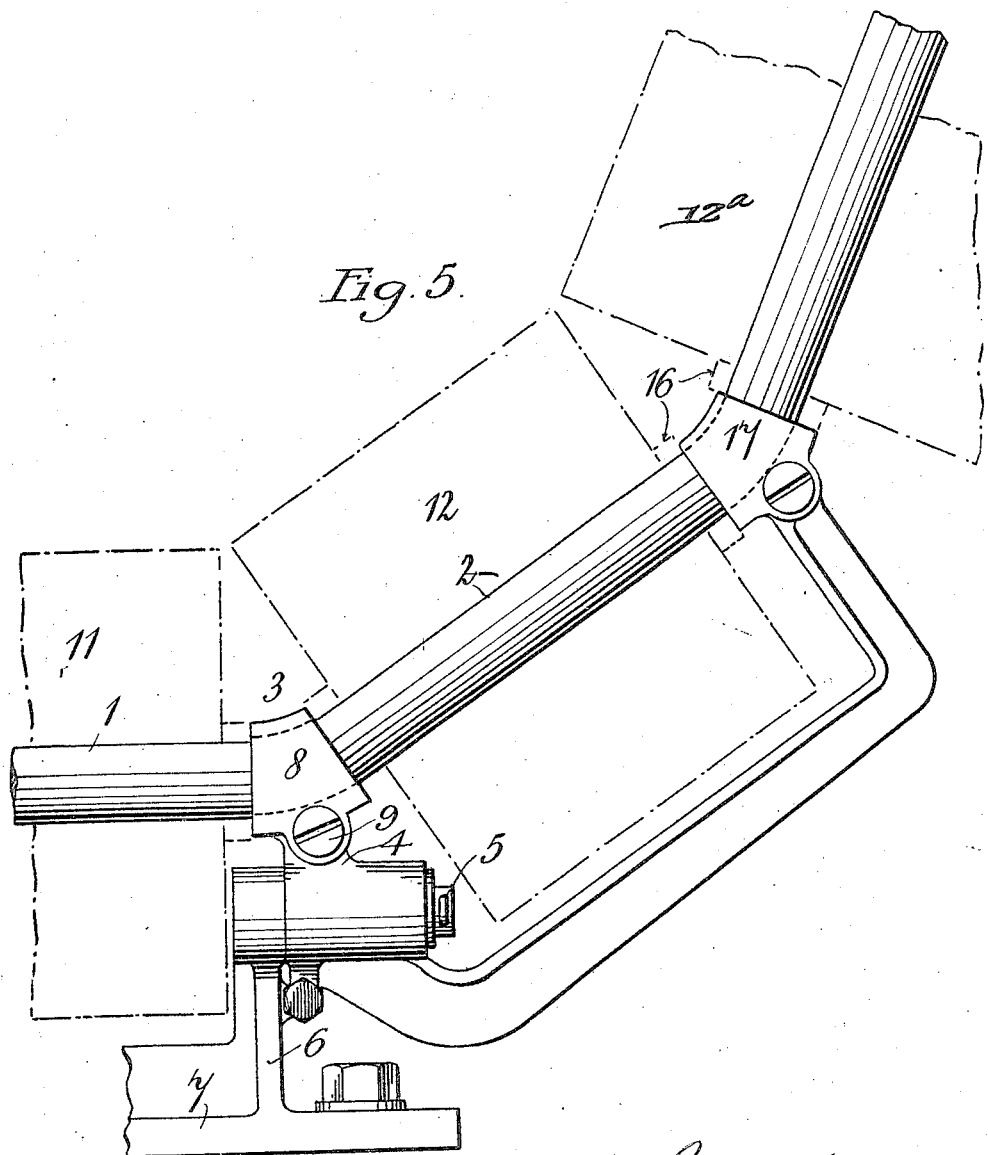

Patented Feb. 20, 1923.

1,446,264

UNITED STATES PATENT OFFICE.

FREDERICK GILBERT MITCHELL, OF HYDE PARK, LONDON, ENGLAND.

SUPPORTING AND GUIDING MEANS FOR ENDLESS BAND AND LIKE CONVEYERS.

Application filed December 30, 1919. Serial No. 348,461.

*To all whom it may concern:*

Be it known that I, FREDERICK GILBERT MITCHELL, a subject of the King of Great Britain and Ireland, residing at Hyde Park, in the county of London, England, have invented Improvements in or Relating to Supporting and Guiding Means for Endless Band and like Conveyers, of which the following is a specification.

Endless band and like conveyers of the kind that are of trough or channel shape on their upper sides, are commonly carried by supporting and guiding means comprising sets of rollers carried by fixed bearings, the rollers in each set being mounted to rotate about stationary axes inclined to one another and arranged in the same plane so as to form a concave support or bed for the band conveyer. Usually, supporting and guiding means of this kind comprises three rollers, namely a lower and central roller mounted to rotate about a horizontal axis, and two lateral rollers each mounted to rotate about an outwardly and upwardly inclined axis. Heretofore the lower roller has been mounted to rotate about a hollow spindle the ends of which are fixed in holes bored in a pair of bearings bolted to a base plate, the outer or laterally disposed rollers being mounted to rotate about separate spindles inclined to the lower one and fixed at their lower ends in the opposite ends of the holes in the bearings to those in which the ends of the lower spindle are fixed. With this construction, the bearings have to be made unduly heavy and independent of each other and of the base plate therefor and have to be machined to receive the ends of the spindle; the spindles, or bearings, or both, are liable to become fractured if the outer rollers should accidentally be subjected to undue loads; sand from unmachined portions of the holes in the bearings is liable to become mixed with the lubricant feed through the spindles, which are made hollow and perforated, and interfere with the proper lubrication of the rollers, and the several parts cannot be quickly assembled or taken apart when desired.

Now the present invention has for its object to provide supporting and guiding means of the type referred to for endless band conveyers of the kind mentioned, that shall be free from the objections above indicated as obtaining with the known construction of band supporting and guiding means.

For this purpose, in band supporting and guiding means according to the present invention, the lower and lateral rollers are carried by a single spindle formed of a tube suitably bent to form a lower horizontal portion and two oppositely arranged outwardly and upwardly inclined lateral portions and the bearings (sometimes briefly termed carriers) for carrying such bent tubular spindle are adapted, as by being provided with a removable cap or cover, or by being made open ended, that is to say, of bifurcated or fork shape, so that the bent spindle can be placed in them sideways instead of endways and then fixed in any desired position for use by suitable means, as for instance set screws or by clamping it in place. The lower roller may be split to admit of its being secured on the lower horizontal portion of the spindle. Or an unsplit roller having a boss with a sufficiently large bore to admit of its being passed endways on to the lower horizontal portion of the spindle may be used, means, as for instance a split bush, being then used to support the roller in position on the spindle. The two outer or lateral rollers are slipped over the outer end portions of the spindle and arranged to bear against the outer sides of the bearings suitably formed for the purpose, or against collars fixed on the spindle.

By the construction described, not only is a single spindle used instead of several but its use admits of the bearings being cast in one piece with a single base plate; no machining of the bearings is necessary; the several parts can be quickly assembled and secured in position for use, the spindle with its rollers can be readily adjusted to admit of the axes thereof being arranged in a vertical or inclined plane to suit requirement, and, as the lubricant admitted to the hollow spindle can only pass through the lateral openings therein to the bosses of the rollers, there is no liability of its becoming contaminated with sand or other gritty matter. Furthermore, as the lateral and central portions of the spindle are in one piece, considerable resistance will be offered to any undue bending stresses that may come on the outer portions of the spindle and such bending stresses will not be transmitted to the bearings.

As will be obvious various constructional embodiments of the invention are permissible certain of which, simpler than others, will be self-evident from those now about to be described with reference to the accompanying drawings which illustrate adjustable spindle arrangements.

Of these drawings Fig. 1 is a part end elevation of a portion of the arrangement referred to and Fig. 2 is a side elevation of a part of the same. Fig. 3 is a similar view to Fig. 1 showing a modification. Fig. 4 is a longitudinal section of the lower roller showing a modified arrangement. Fig. 5 is a similar view to Fig. 1 showing a further modification.

In the example shown in Figs. 1 and 2, a spindle 1 having integral therewith two inclined portions, one of which is alone shown at 2, is held at each of the angular regions 3 by a forked or divided carrier or bearing comprising a member 4 pivoted at 5 to a bracket 6 formed integral with a base plate 7, and a removable member 8 adapted to be clamped to the member 4, as by a screw 9. The spindle 1, 2 is consequently rigidly held by the members 4, 8 and in order that the plane in which the portions 1, 2 lie can be altered, the angular position of the member 4 can be adjusted by means of the screws 10. If such adjustment is not desired, then the member 4 may be made integral with the bracket 6, as shown in Fig. 3. In this case, adjustment of the plane containing the axes of the horizontal and inclined portions of the spindle and the rollers can be made by slackening the set screws 9 and turning the whole about the axis of the lower portion 1 of the spindle.

In the example shown in Fig. 1, there are three rollers, namely a lower and central roller 11 and two outer rollers 12, only one of which is shown, 13 and 14 being collars or abutments to retain the rollers in place endways. The lower roller 11 is made in two halves bolted together to admit of its being mounted on the lower portion of the spindle. In Fig. 4 the lower roller 11 is made in one piece having the bore through its hub sufficiently large in diameter to admit of its being passed endways over one of the inclined portions 2 of the spindle on to the lower portion 1 thereof upon which it is supported by a bush 15 made in two parts secured together.

If more than three angularly disposed rollers are required, say for instance five, as shown in Fig. 5, the spindle 1—2 can, as shown, be suitably bent to form five angularly disposed portions for the several rollers, suitably shaped distance pieces 16 being provided on the spindle between the two inner laterally arranged rollers 12 and the two outer laterally arranged rollers 12$^a$ for supporting the outer rollers in position endways. Usually, only one pair of bearings arranged at the ends of the lower horizontal roller will be necessary in this arrangement but if in the case of a very wide set of such rollers, additional bearings are necessary they can, as shown at 17, be arranged between the two inner and two outer rollers. In such a case the additional bearings may be cast in one piece with the base piece plate 7, if it is not desired to adjust the plane containing the axes of the bent portions of the spindle, otherwise they will need to be independent bearings and be connected for example to the pivoted bearings 4 as shown.

What I claim is:—

1. Band supporting and guiding means of the kind referred to, comprising rollers, a single spindle bent so as to form a number of straight portions inclined to one another but occupying a common plane, which portions are adapted to carry the various rollers, stationary supporting means for said spindle and means adapted to admit of the single bent spindle being adjusted in position as one piece to alter the plane in which its various portions lie, substantially as described.

2. Band supporting and guiding means of the kind herein referred to, comprising a single spindle bent so as to form a number of straight portions integral with and inclined to one another but occupying a common plane, one portion being central and horizontal, bearing means located at the ends of the central straight portion of the spindle for carrying said spindle, said bearing means being adapted to admit of adjustment of the spindle as a whole about a horizontal axis and of holding the spindle in its adjusted position, stationary supporting means for said bearing means and rollers mounted on the said straight portions of spindle.

3. Band supporting and guiding means of the kind herein referred to, comprising a plate, upwardly extending supporting means carried thereby, a single spindle bent so as to form a number of straight portions inclined to one another but located in a common plane, one portion being central and horizontal and carried at its end portions by said supporting means, said supporting means being adapted to admit of the bent spindle being turned about a horizontal axis for the purpose set forth and to hold said spindle in its adjusted position and rollers mounted on the several portions of the spindle, substantially as described.

4. Band supporting and guiding means of the kind referred to, comprising rollers, a spindle bent so as to form a number of straight portions inclined to one another but occupying a common plane, which portions are adapted to carry the various rollers, a stationary bracket, a pair of carriers in which the spindle is rigidly mounted, pivoted about an axis parallel to a straight portion of the spindle extending between the carriers and means for holding such carriers in adjusted position.

5. In band supporting and guiding means of the kind referred to, a base plate, a pair of upstanding brackets thereon, a pair of aligned pivot pins projecting from such brackets, a bent roller-carrying spindle, arranged with an intermediate portion thereof parallel to the pivot pins aforesaid, carriers mounted upon such pivot pins to which carriers the spindle is attached and means for adjusting the carriers about the pivot pins and holding them in adjusted position.

6. In band supporting and guiding means of the kind referred to, a spindle bent so as to possess a number of straight portions extending in opposite directions from each end of a central straight portion, a base plate, a pair of upstanding brackets thereon, a pair of aligned pivot pins projecting from such brackets and parallel to which the said central part of the bent spindle is arranged, carriers arranged to engage the bent spindle at the regions between the various straight portions, the said several carriers disposed to one side of each bracket being rigidly united and mounted upon the corresponding pivot pin, and means for holding such carriers in different positions.

Signed at London, England, this 16th day of December, 1919.

FREDERICK GILBERT MITCHELL.